United States Patent
Yang et al.

(10) Patent No.: US 10,261,983 B2
(45) Date of Patent: Apr. 16, 2019

(54) METHOD AND DEVICE FOR WEBPAGE BROWSING, AND MOBILE TERMINAL

(71) Applicant: TENCENT TECHNOLOGY (SHENZHEN) COMPANY LIMITED, Shenzhen, Guangdong (CN)

(72) Inventors: Wei Yang, Shenzhen (CN); Liming Zhang, Shenzhen (CN); Jingjun Zhu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 229 days.

(21) Appl. No.: 14/040,607

(22) Filed: Sep. 27, 2013

(65) Prior Publication Data
US 2014/0033023 A1  Jan. 30, 2014

Related U.S. Application Data

(63) Continuation of application No. PCT/CN2012/079053, filed on Jul. 23, 2012.

(30) Foreign Application Priority Data

Aug. 8, 2011 (CN) .......................... 2011 1 0225313

(51) Int. Cl.
*G06F 17/22* (2006.01)
*G06F 16/957* (2019.01)

(52) U.S. Cl.
CPC ...... *G06F 17/2247* (2013.01); *G06F 16/9577* (2019.01)

(58) Field of Classification Search
CPC .......................... G06F 17/2247; G06F 16/9577
(Continued)

(56) References Cited

U.S. PATENT DOCUMENTS

| 2004/0019523 | A1* | 1/2004 | Barry | G06Q 30/02 |
| | | | | 705/14.73 |
| 2005/0078868 | A1* | 4/2005 | Chen | G06F 17/30843 |
| | | | | 382/171 |

(Continued)

FOREIGN PATENT DOCUMENTS

| CN | 101833586 A | * | 9/2010 |
| CN | 101918946 A | | 12/2010 |
| CN | 102024028 A | * | 4/2011 |

OTHER PUBLICATIONS

International Search Report in international application No. PCT/CN2012/079053, dated Oct. 25, 2012.

(Continued)

*Primary Examiner* — Stephen S Hong
*Assistant Examiner* — Broderick C Anderson
(74) *Attorney, Agent, or Firm* — Anova Law Group, PLLC

(57) ABSTRACT

A webpage browsing method, a webpage browsing device and a mobile terminal are provided. The method comprises: downloading page information of a requested webpage a webpage request from a user is received; analyzing the page information to obtain the page core content of the requested webpage; and typesetting the page core content and displaying the requested webpage that has been typeset, such that transmission bandwidth is saved, response to a webpage request is quickened, and meanwhile the webpage browsing effect and browsing experience of a user are improved.

20 Claims, 9 Drawing Sheets

(58) Field of Classification Search
USPC .......................................................... 715/234
See application file for complete search history.

(56) References Cited

U.S. PATENT DOCUMENTS

| | | | |
|---|---|---|---|
| 2007/0073650 A1* | 3/2007 | Lueck | G06F 17/30905 |
| 2009/0070413 A1* | 3/2009 | Priyadarshan | G06F 17/2247 |
| | | | 709/203 |
| 2009/0100462 A1* | 4/2009 | Park | G06F 17/30849 |
| | | | 725/38 |
| 2010/0332485 A1 | 12/2010 | Lahti | |
| 2012/0284221 A1* | 11/2012 | Shelton | H04L 41/0604 |
| | | | 706/47 |
| 2013/0283148 A1* | 10/2013 | Lim | G06F 17/30896 |
| | | | 715/234 |

OTHER PUBLICATIONS

English Translation of the Written Opinion of the International Search Authority in international application No. PCT/CN2012/079053, dated Oct. 25, 2012.

* cited by examiner

Fig. 11

```
┌─────────────────────────────────────────────┐
│  Forged Mining Disaster Occurred in Yunnan , 6 People │
│  Murdered a Mentally Retarded Tramp for Defrauding    │
│                  Compensation                          │
│    ┌─────────────────────────────────────┐            │
│    │                                     │            │
│    │                                     │            │
│    │              Picture                │            │
│    │                                     │            │
│    │                                     │            │
│    └─────────────────────────────────────┘            │
│    ┌─────────────────────────────────────┐            │
│    │                                     │            │
│    │         ···Page core body ···       │            │
│    │                                     │            │
│    └─────────────────────────────────────┘            │
└─────────────────────────────────────────────┘
```

METHOD AND DEVICE FOR WEBPAGE BROWSING, AND MOBILE TERMINAL

CROSS REFERENCE TO RELATED APPLICATIONS

This is a continuation application of International Patent Application No.: PCT/CN2012/079053, filed on Jul. 23, 2012, which claims priority to Chinese Patent Application No.: 201110225313.3 filed on Aug. 8, 2011, the disclosure of which are incorporated by reference herein in their entirety.

TECHNICAL FIELD

The present disclosure relates to the field of Internet technology, and in particular to method and device for webpage browsing and a mobile terminal.

BACKGROUND

Internet has become an indispensable part of people's life. Conventional Internet is accessed through a Personal Computer (PC), that is, people access Internet through a PC. With the flourishing development of mobile terminal technology, people now can access Internet through a mobile terminal anytime and anywhere.

Comparing with accessing Internet through a PC, accessing Internet through a mobile terminal is quite different. First, there are many types of operation platform for mobile terminal, for example, Android platform, Symbian platform, Apple platform and the like. Since the browser device supported by each platform is different from each other, all types of mobile terminals can not adopt a uniform browser device, and thus conventional Hypertext Markup Language (HTML) webpage can not be well presented in all types of mobile terminals. Second, the configuration of the mobile terminal generally is lower than that of the PC, for example, some non-smart phones or ordinary smart phones, of which the configuration generally are relatively low, can not well support some content-rich HTML webpages. Third, the mobile terminal generally accesses a wireless network, which has a low bandwidth and a slow speed compared with conventional wired network. Therefore, for conventional HTML webpages (generally of dozens of KB), the mobile terminal has a very poor browsing effect.

In order to solve the above problem that the mobile terminal can not well support HTML webpages, some solutions have been proposed at present, which mainly include:

(1) Replacing or deleting the HTML tag not supported by Wireless Application Protocol (WAP), so as to convert the HTML webpage into a standard WAP webpage, so that the mobile terminal can access the HTML webpage normally. Since the display interface of the mobile terminal is smaller than that of the PC, and this solution only processes the tag of the HTML webpage, it can not realize compression of webpage and presentation of page core content, so that users can not find useful information directly from the WAP webpage displayed by the mobile terminal.

(2) Deleting the multimedia information contained in the HTML webpage, so that the mobile terminal can browse the HTML webpage. This solution makes the HTML webpage displayed by the mobile terminal lack abundant multimedia information, and thus reduces the readability of webpages and reduces the reading interest of users.

(3) Tailoring HTML webpages, compressing original webpages and saving transmission bandwidth. Since this solution does not process the tag and multimedia information of webpages, many mobile terminals can not display the webpages normally. Therefore, browsing experience of users is reduced.

SUMMARY

The technical problem to be solved by the embodiment of the present disclosure is to provide a method for webpage browsing, a device for webpage browsing, and a mobile terminal, which can save transmission bandwidth, quicken response to a webpage request, and meanwhile improve webpage browsing effect and browsing experience of a user.

In order to solve the technical problem above, the embodiment of the present disclosure provides a method webpage browsing, including:

downloading page information of a requested webpage when a webpage request from a user is received;

analyzing the page information to obtain the page core content of the requested webpage; and typesetting the page core content and displaying the requested webpage that has been typeset.

Correspondingly, the embodiment of the present disclosure also provides a device for webpage browsing, including:

a webpage download module, configured to download page information of a requested webpage when a webpage request from a user is received;

a webpage analysis module, configured to analyze the page information downloaded by the webpage download module to obtain the page core content of the requested webpage;

a typesetting module, configured to typeset the page core content obtained by the webpage analysis module; and a display module, configured to display the requested webpage that has been processed by the typesetting module.

Correspondingly, the embodiment of the present disclosure also provides a mobile terminal, including a webpage browsing device, wherein the webpage browsing device includes:

a webpage download module, configured to download page information of a requested webpage when a webpage request from a user is received;

a webpage analysis module, configured to analyze the page information downloaded by the webpage download module to obtain the page core content of the requested webpage;

a typesetting module, configured to typeset the page core content obtained by the webpage analysis module; and a display module, configured to display the requested webpage that has been processed by the typesetting module.

The embodiment of the present disclosure analyzes the webpage requested by the user to obtain the page core content of the requested webpage, typesets the page core content and then displays the typeset content. Since only the page core content of the conventional HTML webpage is extracted, transmission bandwidth is saved and response to the webpage is quickened; since only the page core content is typeset, the mobile terminal can normally present the typeset webpage, meanwhile the user can find useful information (that is, page core content) directly from the webpage displayed by the mobile terminal, thus webpage browsing effect and browsing experience of the user are improved.

BRIEF DESCRIPTION OF THE DRAWINGS

FIG. 11 shows a second diagram of the application of the webpage browsing method according to the present disclosure.

DETAILED DESCRIPTION

The technical solutions provided in the embodiments of the present disclosure will be described below clearly and completely with reference to the accompanying drawings. It should be appreciated that the described embodiment is only a part of embodiments of the present disclosure, instead of all the embodiments. Based on the embodiments provided in the present disclosure, all other embodiments, which can be anticipated by persons of ordinary skilled in the art without any inventive work, should also fall within the scope of the present disclosure.

The embodiment of the present disclosure provides a mobile terminal, and the mobile terminal includes a device for webpage browsing, wherein the webpage browsing device is capable of providing good webpage browsing services for mobile terminal users. It should be noted that the mobile terminal can be: a mobile phone, a smart phone, a Personal Digital Assistant (PDA), a portable tablet PC and other terminals; the webpage browsing device can be: a browser device.

For a better understanding of the present disclosure, the webpage browsing device in the mobile terminal of the present disclosure is described below in detail.

Figure 1:
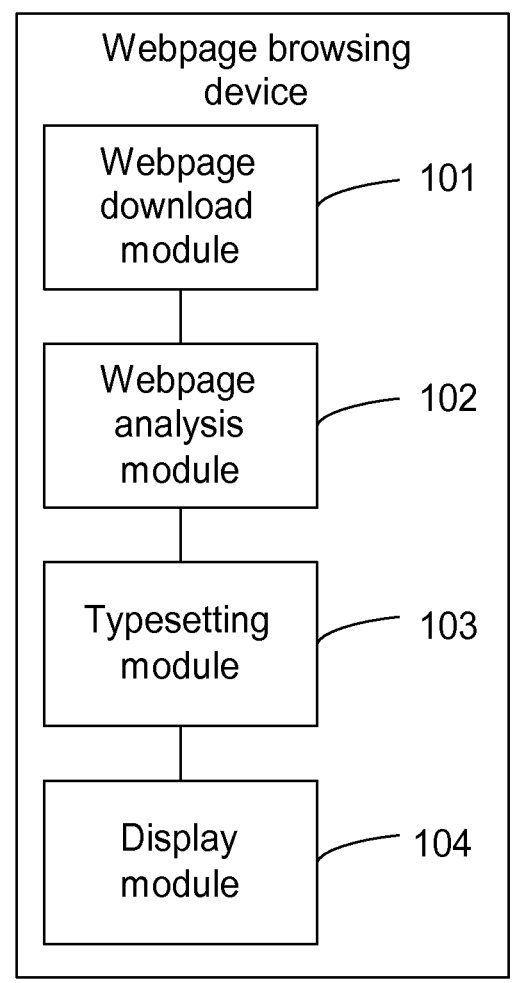
FIG. 1 shows a structure diagram of a first embodiment of a webpage browsing device according to the present disclosure.

Refer to FIG. 1, which shows a structure diagram of a first embodiment of the webpage browsing device of the present disclosure, wherein the webpage browsing device includes:

a webpage download module 101, configured to download page information of a requested webpage when a webpage request from a user is received.

The webpage browsing device provides a man-machine interface, through which the user can send out a webpage request, for example: the webpage browsing device provides an address bar for the user, and the user can input a Uniform/Universal Resource Locator (URL) of the requested webpage in the address bar and send the webpage request to the webpage browsing device after confirmation, wherein the webpage request carries the URL input by the user. For another example, the webpage browsing device displays a certain webpage for the user, and when the user clicks in the current webpage a link of another webpage, the webpage browsing device receives a webpage request from the user, wherein the webpage request carries the link address (URL) of the webpage requested by the user. When the webpage browsing device receives the webpage request from the user, the webpage download module 101 downloads page information of the requested webpage from Internet according to the webpage request, wherein the page information includes: HTML source webpage and related enclosure; the HTML source webpage may include: HTML source code information, HTML tag and source address of multimedia information; and the related enclosure includes: one or more of Cascading Style Sheets (CSS), Frame (an ActiveX) and JavaScript (JS, which is a webpage scripting language).

a webpage analysis module 102, configured to analyze the page information downloaded by the webpage download module 101 to obtain the page core content of the requested webpage.

The webpage analysis module 102 analyzes the HTML source webpage and related enclosure downloaded by the webpage download module 101, wherein the analysis may include: processing the HTML tag in the HTML source webpage to obtain a page title; and/or, extracting the page core body in the HTML source webpage; and/or, extracting the page core multimedia information in the HTML source webpage. Through the analysis of the webpage analysis module 102, the page core content of the requested webpage can be obtained. It should be appreciated that except the page core content obtained by the webpage analysis module 102, other content in the requested webpage is noise information.

a typesetting module 103, configured to typeset the page core content obtained by the webpage analysis module 102.

The typesetting module 103 typesets the page core content obtained by the webpage analysis module 102, wherein the page core content includes: a page title, a page core body and page core multimedia information, and the typesetting process of the typesetting module 103 may include: based on the HTML source webpage and related enclosure, the typesetting module 103 typesets according to the position where the page core content is located in the original requested webpage and the display manner; converting the HTML webpage formed by the typesetting process according to the requirement of a display interface supported by the webpage browsing device, to obtain a webpage format supported by the webpage browsing device, for example, HTML webpage, WAP1.0 webpage format or WAP2.0 webpage format.

It should be noted that, during the process of the typesetting module 103 typesetting the page core content, other noise information in the HTML webpage except the page core content can be dropped, folded or hidden according to actual requirements.

a display module 104, configured to display the requested webpage that has been processed by the typesetting module 103.

After the process of the typesetting module 103, the requested webpage is converted into the webpage format supported by the webpage browsing device, and the display module 104 can display the requested webpage directly. It should be appreciated that the display module 104 can display the requested webpage on a display interface provided by the webpage browsing device, for example, display the requested webpage on the display interface of the mobile terminal in which the webpage browsing device is located; the display module 104 can also display the requested webpage on a display interface supported by the webpage browsing device, for example, display the requested webpage on an external display interface connected with the webpage browsing device.

The embodiment of the present disclosure can save transmission bandwidth, quicken response to a webpage request, and meanwhile improve webpage browsing effect and browsing experience of a user.

Figure 2:
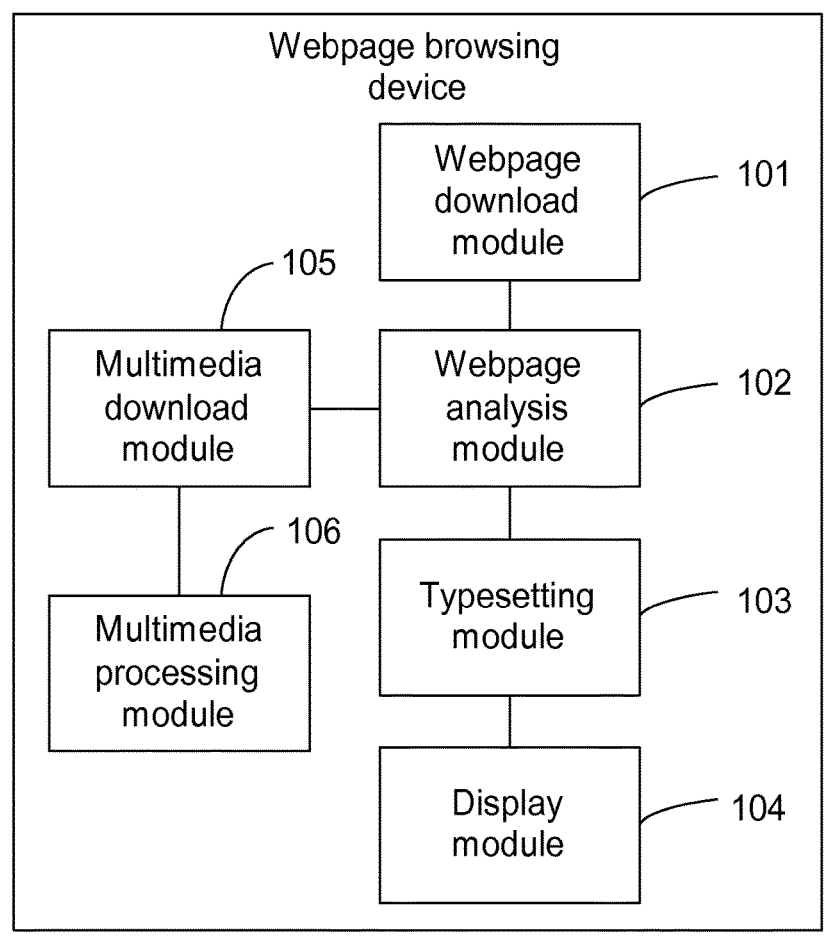
FIG. 2 shows a structure diagram of a second embodiment of the webpage browsing device according to the present disclosure.

Refer to FIG. 2, which shows a structure diagram of a second embodiment of the webpage browsing device according to the present disclosure, wherein the webpage browsing device, the same as the above embodiment, includes: a webpage download module 101, a webpage analysis module 102, a typesetting module 103 and a display module 104. In this embodiment, the webpage browsing device further includes:

a multimedia download module 105, which is connected with the page analysis module 102 and is configured to download page core multimedia information from Internet according to a source address corresponding to the page core multimedia information.

As described above, the webpage analysis module 102 can obtain the page core multimedia information of the requested webpage, the multimedia download module 105 can read the source address corresponding to the page core multimedia information from the HTML source webpage and download the page core multimedia information from Internet according to the source address, wherein the page core multimedia information is the multimedia information related to the page core body, including but not limited to: any one or more of picture, video and Flash.

a multimedia processing module 106, configured to thumbnail-process the page core multimedia information downloaded by the multimedia download module 106 according to the requirement of a display interface to obtain a thumbnail picture, store the thumbnail picture and save the storage address of the thumbnail picture.

Since the display interface supported or provided by the webpage browsing device is limited in size, for example, the size of the display interface of the mobile terminal in which the webpage browsing device is located is far less than the size of the display interface of a conventional PC, the page core multimedia information downloaded by the multimedia download module 105 is not suitable to be displayed on the display interface of the mobile terminal. Meanwhile, in order to improve the transmission rate of the multimedia information and quicken the response of webpage, it is required to thumbnail-process the page core multimedia information through the multimedia processing module 106, wherein this process may include: when the page core multimedia information is a picture, thumbnail-processing the picture according to the length and width of the display interface to form a thumbnail picture, storing the thumbnail picture and saving the storage address of the thumbnail picture; when the page core multimedia information is a video or Flash, first extracting at least one key-frame image of the video or Flash and then thumbnail-processing the key-frame image according to the length and width of the display interface to form a thumbnail picture, storing the thumbnail picture and saving the storage address of the thumbnail picture; wherein the length of the thumbnail picture obtained by the multimedia processing module 106 is not greater than the length of the display interface, and the width of the thumbnail picture is not greater than the width of the display interface.

Figure 3:
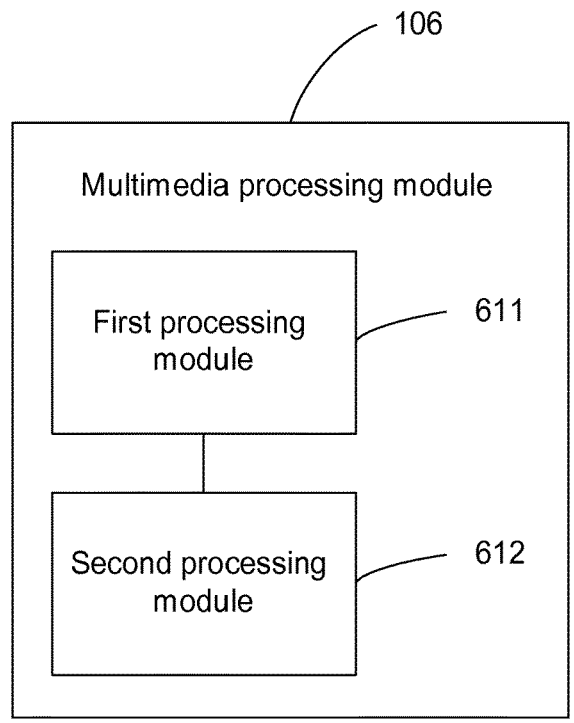
FIG. 3 shows a structure diagram of the embodiment of a multimedia processing module in the webpage browsing device according to the present disclosure.

For specific implementation, refer to FIG. 3, which shows a structure diagram of the embodiment of the multimedia processing module 106 in the webpage browsing device of the present disclosure, wherein the multimedia processing module 106 includes:

a first processing submodule 611, configured to: when the page core multimedia information is a picture, thumbnail-process the picture according to the length and width of the display interface to form a thumbnail picture; and a second processing submodule 612, which is configured to: when the page core multimedia information is a video or Flash, extract at least one key-frame image of the video or Flash, and thumbnail-process the key-frame image according to the length and width of the display interface to form the thumbnail picture.

The length of the thumbnail picture obtained by the first processing submodule 611 and the second processing submodule 612 is not greater than the length of the display interface, and the width of the thumbnail picture is not greater than the width of the display interface. It should be appreciated that the thumbnail process of the first processing submodule 611 and the second processing submodule 612 is similar to the existing thumbnail process of pictures, and no further description is needed here.

It should be noted that the thumbnail picture obtained by the multimedia processing module 106 is finally provided to the typesetting module 103 to be typeset before being displayed, so that multimedia display effect can be ensured, readability of webpage can also be increased. Meanwhile, transmission rate of multimedia information and webpage response speed can be improved.

The embodiment of the present disclosure can save transmission bandwidth, quicken response to a webpage request, and meanwhile ensure readability of webpage, improve webpage browsing effect and browsing experience of users.

For a better understanding of the present disclosure, the webpage download module 101 included in the webpage browsing device in the embodiment of the present disclosure is described below in detail.

Figure 4:
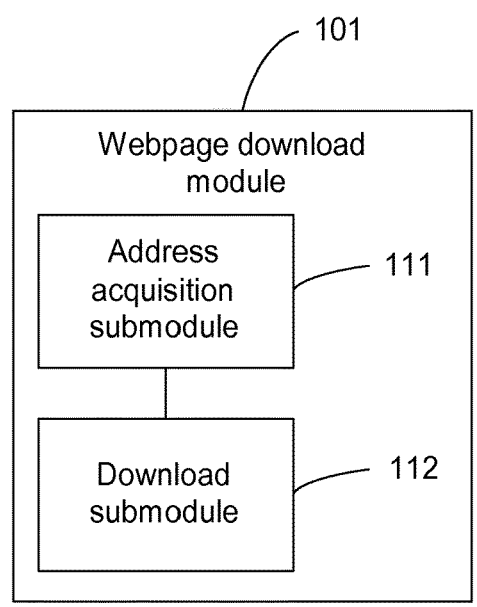
FIG. 4 shows a structure diagram of the embodiment of a webpage download module in the webpage browsing device according to the present disclosure.

Refer to FIG. 4, which shows a structure diagram of the embodiment of the webpage download module 101 in the webpage browsing device according to the present disclosure, wherein the webpage download module 101 includes:

an address acquisition submodule 111, configured to acquire a URL of the webpage requested by the user when the webpage request from the user is received.

As described above, the user can send the webpage request to the webpage browsing device by inputting the URL of the requested webpage directly or clicking the link address of the requested webpage, wherein the webpage request carries the URL of the requested webpage; when receiving the webpage request from the user, the address acquisition submodule 111 extracts the URL of the webpage requested by the user from the webpage request.

a download submodule 112, which is configured to download, from Internet, page information of the webpage corresponding to the URL obtained by address acquisition submodule 111, wherein the page information of the webpage requested by the user downloaded from Internet by the download submodule 112 according to the URL acquired by the address acquisition submodule 111 includes: HTML source webpage and related enclosure; the HTML source webpage may include: HTML source code information, HTML tag and source address of multimedia information; and the related enclosure includes: one or more of CSS, Frame and JS.

For a better understanding of the present disclosure, the webpage analysis module included in the webpage browsing device in the embodiment of the present disclosure is described below in detail.

Figure 5:
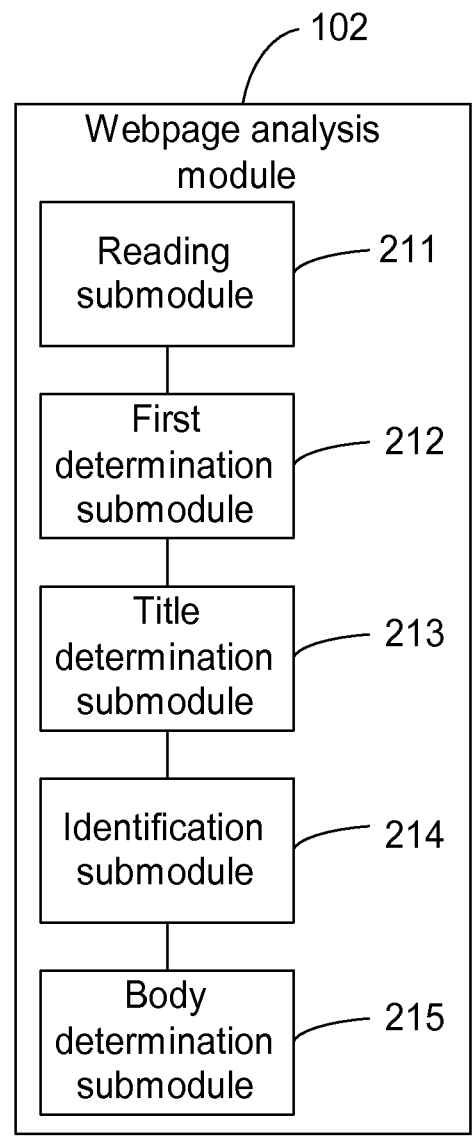
FIG. 5 shows a structure diagram of a first embodiment of a webpage analysis module in the webpage browsing device according to the present disclosure.

Refer to FIG. 5, which shows a structure diagram of a first embodiment of the webpage analysis module in the webpage browsing device according to the present disclosure. In this embodiment, the page core content of the requested webpage includes: a page title and a page core body, and then the webpage analysis module 102 includes:

a reading submodule 211, which is configured to read from the HTML source webpage a text in an H tag (text title tag) and a text in a Title tag, wherein the H tag includes: any one of H1 tag, H2 tag, H3 tag, H4 tag, H5 tag and H6 tag; the H tag (H1 tag to H6 tag) refers to a tag for emphasizing the importance of the text title in the HTML webpage; tags <H1>, <H2>, <H3>, <H4>, <H5> and <H6> represent that importance is diminished in turn, wherein tag <H1> represents the most important text title, while <H6> represents the least important text title. Preferably, the reading submodule 211 reads from the HTML source webpage the text in the H1 tag and the text in the Title tag. The Title tag is included in a Head tag of the HTML source webpage and is used to define the title of a page document, with the main purpose of informing the subject of this document to a visitor and providing an index to a search engine; the text in the Title tag and the text in the H tag (H1 tag to H6 tag) may be the same, or different.

a first determination submodule 212, which is configured to determine whether the similarity between the text in the H tag and the text in the Title tag which are read by the reading submodule 211 is greater than a preset threshold.

The preset threshold can be set according to actual requirements, and the value of the threshold can be in a range of 0-100%; for example: the threshold can be set to 90%, and the first determination submodule 212 determines whether the similarity between the text in the H1 tag and the text in the Title tag is above 90%, here an example can be provided for illustration, supposing the reading submodule 211 reads from the H1 tag a 11-character text and reads from the Title tag a 11-character text, and the first determination submodule 212 determines that the text in the H1 tag has 10 characters the same as the text in the Title tag, then the first determination submodule 212 determines that the two texts have a similarity of above 90%. It should be appreciated that the preset threshold can be other values, and the first determination submodule 212 also can adopt other methods to perform the determination of similarity, and the analysis in other conditions is similar to the above and no further description is required here.

A title determination submodule 213 is configured to determine the text in the H tag as the page title of the requested webpage when the determination result of the first determination submodule 212 is Yes.

When the first determination submodule 212 determines that the similarity between the text in the H1 tag and the text in the Title tag exceeds a preset threshold, the title determination submodule 213 determines the text in the H1 tag as the page title of the requested webpage.

An identification submodule 214 is configured to identify the HTML source code information in the HTML source webpage starting from the position where the page title determined by the title determination submodule 213 is located in the HTML source webpage.

In actual application, the position where the page title is located in the HTML source webpage generally is the start of the page core body of the requested webpage. After the title determination submodule 213 determines the page title, the identification submodule 214 identifies the HTML source code information in the HTML source webpage starting from the position where the page title is located in the HTML source webpage.

A body determination submodule 215 is configured to: when the identification submodule 214 identifies that the HTML source code information matched with a preset closing tag, determine the part in the HTML source webpage from the position where the page title is located to the position where the matched HTML source code information is located as the page core body of the requested webpage.

The preset closing tag includes but not limited to: any one or more of "Related Comment" identification, "Related Link" identification, "Related Reading" identification and "Related Recommendation" identification. Generally, when key words such as "Related Comment" or "Related Link" appears in the webpage, it is indicated that the content of the page core body of the webpage is ended. Therefore, the position where "Related Comment" or "Related Link" appears can be determined as the end of the page core body of the webpage. When the identification submodule 214 identifies from the HTML source webpage the HTML source code information matched with the preset closing tag, the body determination submodule 215 determines the part in the HTML source webpage from the position where the page title is located (the start of the page core body) to the position where the matched HTML source code information is located (the end of the page core body) as the page core body of the requested webpage.

It should be noted that, in this embodiment, the analysis process of the webpage analysis module 102 on the page title and the page core body are an example only. In other conditions, for example, the webpage analysis module 102 also can determine the page title and the page core body by adopting other methods such as Navie Bayesian classifier, branch-and-bound, threshold branch and the like. As another example, the webpage analysis module 102 also can establish a Document Object Model (DOM) tree for the HTML source webpage first, thereby determining the page title and the page core body based on the DOM tree. As a further example, the webpage analysis module 102 also can divide the HTML source webpage into blocks, thereby identifying the important webpage blocks to find the page title and the page core body, and so on. The purpose of adopting the other conditions above is to obtain the page title and the page core body, thus, no further description is required here.

Figure 6:
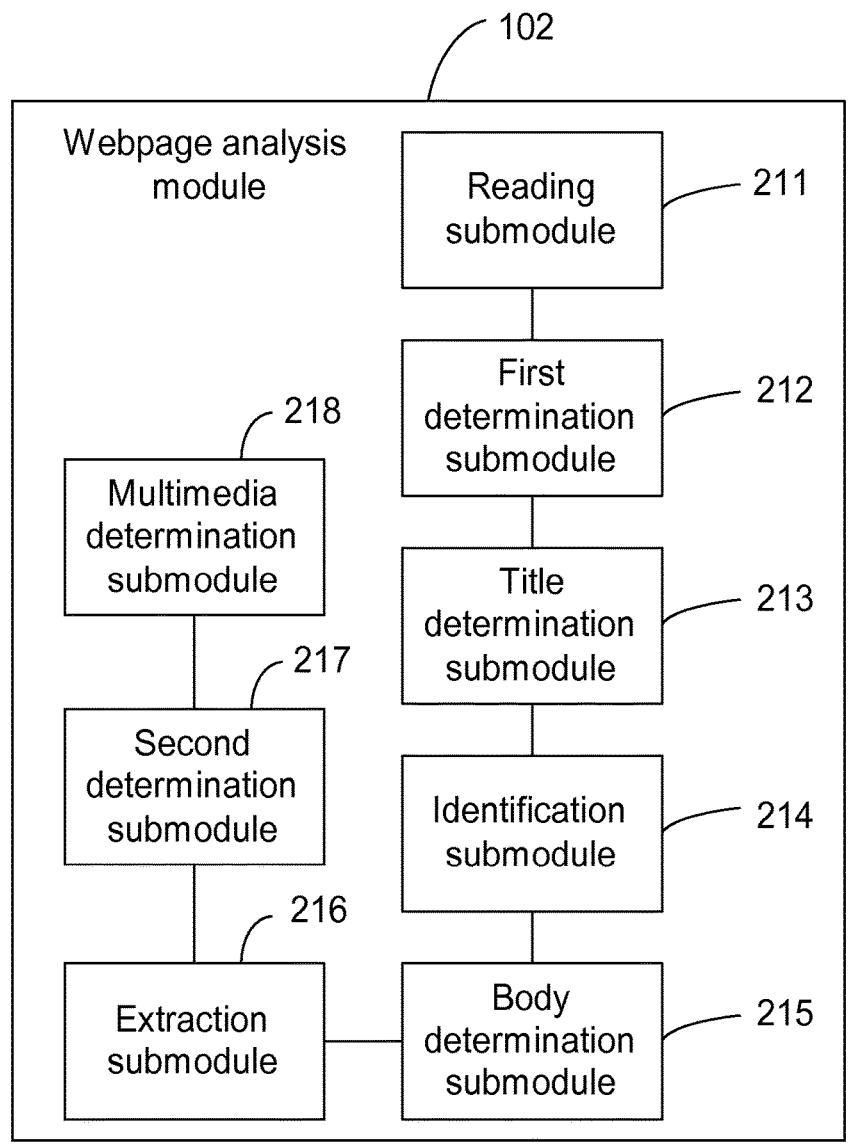
FIG. 6 shows a structure diagram of a second embodiment of the webpage analysis module in the webpage browsing device according to the present disclosure.

Refer to FIG. 6, which shows a structure diagram of a second embodiment of the webpage analysis module 102 in the webpage browsing device according to the present disclosure, wherein the webpage analysis module 102, the same as the above embodiment, includes: a reading submodule 211, a first determination submodule 212, a title determination submodule 213, an identification submodule 214 and a body determination submodule 215. In this embodiment, the page core content of the requested webpage includes: a page title, a page core body and page core multimedia information, and then the webpage analysis module 102 further includes:

an extraction module 216, which is configured to extract from the HTML source webpage the source address of the multimedia information located in the page core body that is determined by the body determination submodule 215.

The page core multimedia information is the multimedia information related to the page core body, including but not limited to: any one or more of picture, video and Flash. In the conventional HTML webpage, there is much multimedia information, while most information is noise information irrelevant to the page core body of the webpage, for example, AD picture, AD Flash and the like, wherein some noise information is located in the page core body of the HTML webpage, and some is surrounding the page core body. The extraction submodule 216 filters the multimedia information surrounding the page core body and extracts from the HTML source webpage the source address of the multimedia information located in the page core body.

a second determination submodule 217, which is configured to determine whether the source address extracted by the extraction submodule 216 contains an AD identification.

Since the source address corresponding to the noise information carries an AD identification, including information of AD provider, AD prompt information and the like, and the multimedia information in the page core body probably is noise information as described above, the second determination submodule 217 further determines whether the source address corresponding to the multimedia information extracted from the page core body by the extraction submodule 216 contains an AD identification; if so, the multimedia information corresponding to the source address containing the AD identification should be noise information; otherwise, the multimedia information corresponding to the source address containing no AD identification should be the multimedia information related to the page core body.

A multimedia determination submodule 218, which is configured to determine the multimedia information corresponding to the source address containing no AD identification as the page core multimedia information according to the determination result of the second determination submodule 217.

For a better understanding of the present disclosure, the typesetting module included in the webpage browsing device in the embodiment of the present disclosure is described below in detail.

Figure 7:
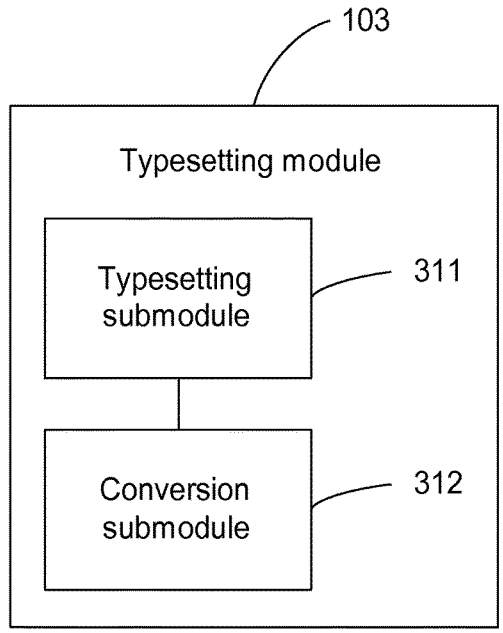
FIG. 7 shows a structure diagram of the embodiment of a typesetting module in the webpage browsing device according to the present disclosure.

Refer to FIG. 7, which shows a structure diagram of the embodiment of the typesetting module 103 in the webpage browsing device according to the present disclosure, wherein the typesetting module 103 includes:

a typesetting submodule 311, which is configured to typeset the page core content according to the HTML source webpage and related enclosure to form an HTML webpage.

The typesetting submodule 311 typesets the page core content, wherein the page core content includes: a page title, a page core body and page core multimedia information; the process of the typesetting submodule 311 may include: based on the HTML source webpage and related enclosure, the typesetting submodule 311 typesets according to the position where the page core content is located in the original requested webpage and the display manner to form an HTML webpage. For example, the HTML source webpage records the position where the page title is located in the HTML source webpage, meanwhile CSS records the font type and colour of the page title, and the typesetting submodule 311 arranges the page title to a corresponding position in the HTML webpage according to the record in the HTML source webpage, and meanwhile processes the page title in accordance with the corresponding font type and colour recorded in the CSS. Through the typesetting process of the typesetting submodule 311, the formed HTML webpage has the same effect in displaying the page core content as the original requested HTML webpage, and the readability of the page is not lost.

A conversion submodule 312, which is configured to convert the HTML webpage formed by the typesetting submodule 311 according to the requirement of the display interface to form a converted requested webpage.

The conversion process of the conversion submodule 312 may include: replacing the source address corresponding to the page core multimedia information in the HTML webpage with the storage address of the corresponding thumbnail picture; and/or replacing or deleting the HTML tag in the HTML webpage not supported by the display interface according to the format requirement of the display interface, to form a WAP webpage, wherein the WAP webpage is WAP1.0 webpage or WAP2.0 webpage. In specific implementation, the conversion submodule 312 performs conversion according to the requirement of the display interface supported or provided by the webpage browsing device, for example, when the mobile terminal in which the webpage browsing device is located can support HTML webpages, but can not well support the multimedia information of the original HTML webpage, then the conversion process of the conversion submodule 312 may include: replacing the source address corresponding to the page core multimedia information in the typeset HTML webpage with the storage address of the corresponding thumbnail picture, to finally form a HTML webpage to provide to the mobile terminal to display. For another example, when the mobile terminal in which the webpage browsing device is located can not well support HTML webpages, but the function of the display interface is powerful and can support multimedia information, then the conversion submodule 312 can replace or delete the HTML tag in the HTML webpage not supported by the display interface according to the format requirement of the display interface, to finally form a WAP1.0 webpage or WAP2.0 webpage to provide to the mobile terminal to display. As a further example, when the mobile terminal in which the webpage browsing device is located can not well support HTML webpages, but supports WAP1.0 webpage or WAP2.0 webpage only, then the conversion submodule 312 first replaces the source address corresponding to the page core multimedia information in the HTML webpage with the storage address of the corresponding thumbnail picture, and then replaces or deletes the HTML tag in the HTML webpage not supported by the display interface according to the format requirement of the display interface, to finally form a WAP1.0 webpage or WAP2.0 webpage to provide to the mobile terminal to display.

It should be noted that the webpage browsing device provided in the embodiment of the present disclosure is not only applicable to the mobile terminal referred in the embodiment of the present disclosure, but also applicable to conventional fixed terminals such as PC. When the webpage browsing device is applied to the conventional terminal such as PC, since only the page core content of the webpage is typeset, the presentation speed of the webpage on the PC can be improved, thus the response to the webpage request is quickened and the browsing experience of users is improved.

The embodiment of the present disclosure analyzes the webpage requested by the user to obtain the page core content of the requested webpage, typesets the page core content and then displays the typeset content. Since only the page core content of the conventional HTML webpage is extracted, transmission bandwidth is saved and response to the webpage is quickened; since only the page core content is typeset, the mobile terminal can normally present the typeset webpage, meanwhile the user can find useful information (that is, page core content) directly from the webpage displayed by the mobile terminal, thus webpage browsing effect and browsing experience of the user are improved.

For a better understanding of the present disclosure, a webpage browsing method executed by the webpage browsing device provided in the embodiment of the present disclosure is described below in detail.

Figure 8:
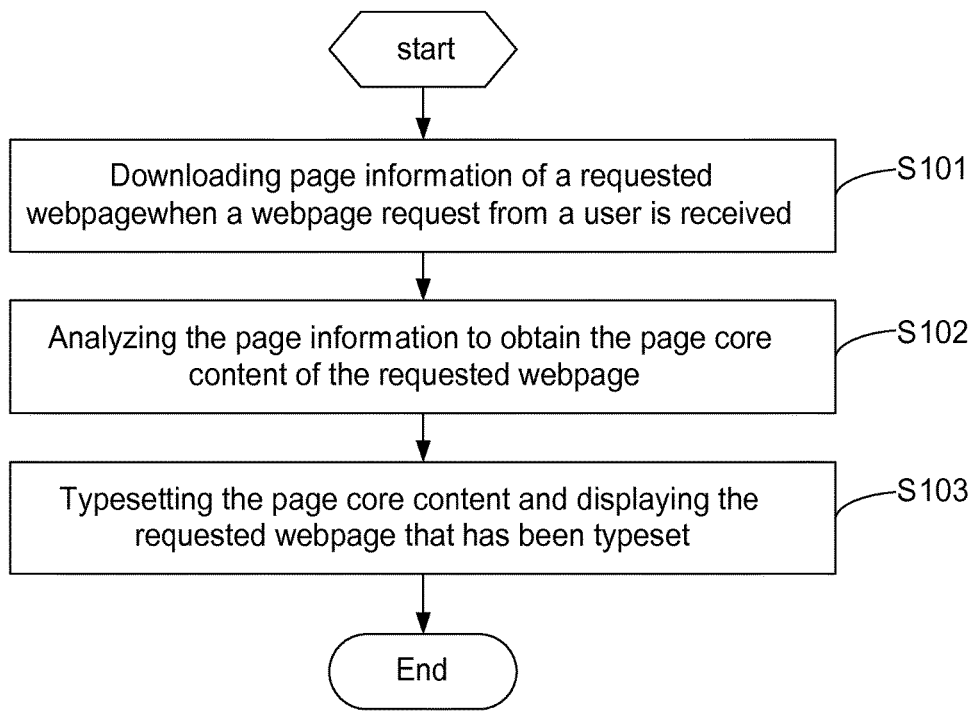
FIG. 8 shows a flowchart of a first embodiment of a webpage browsing method according to the present disclosure.

Refer to FIG. 8, which shows a flowchart of a first embodiment of the webpage browsing method according to the present disclosure. In this embodiment, the executer of the method is the webpage browsing device described above, and the webpage browsing device executes the method according to the following process, including:

Step 101: downloading page information of a requested webpage when a webpage request from a user is received.

The webpage browsing device provides a man-machine interface, through which the user can send out a webpage request, for example: the webpage browsing device provides an address bar for the user, then the user can input a URL of the requested webpage in the address bar and send the webpage request to the webpage browsing device after confirmation, wherein the webpage request carries the URL input by the user. For another example, the webpage browsing device displays a certain webpage for the user, and when the user clicks in the current webpage a link of another webpage, the webpage browsing device receives a webpage request from the user, wherein the webpage request carries the link address (URL) of the webpage requested by the user. In Step 101, when the webpage browsing device receives the webpage request from the user, page information of the requested webpage is downloaded from Internet according to the webpage request, wherein the page information includes: HTML source webpage and related enclosure. The HTML source webpage may include: HTML source code information, HTML tag and source address of multimedia information; and the related enclosure includes: one or more of CSS, Frame and JS.

Step 102: analyzing the page information to obtain the page core content of the requested webpage.

In Step 102, the HTML source webpage and the related enclosure downloaded in Step 101 are analyzed, wherein the analyzing process may include: processing the HTML tag in the HTML source webpage to obtain a page title; and/or, extracting the page core body in the HTML source webpage; and/or, extracting the page core multimedia information in the HTML source webpage. Through the analysis in Step 102, the page core content of the requested webpage can be obtained. It should be appreciated that except the page core content obtained in Step 102, other content in the requested webpage is noise information.

Step 103: typesetting the page core content and displaying the requested webpage that has been typeset.

In Step 103, the page core content obtained in Step 102 is typeset, wherein the page core content includes: a page title, a page core body and page core multimedia information. The process of Step 103 may include: based on the HTML source webpage and related enclosure, typesetting according to the position where the page core content is located in the original requested webpage and the display manner, converting the HTML webpage formed by the typesetting process according to the requirement of a display interface supported by the webpage browsing device, to obtain a webpage format supported by the webpage browsing device, for example, HTML webpage, WAP1.0 webpage format or WAP2.0 webpage format. It should be noted that, during the process of typesetting the page core content in step 103, other noise information in the HTML webpage except the page core content can be dropped, folded or hidden according to actual requirements.

After the typesetting process, the requested webpage is converted into the webpage format supported by the webpage browsing device, and the requested webpage can be displayed directly. It should be appreciated that Step 103 can display the requested webpage on a display interface provided by the webpage browsing device, for example, display the requested webpage on the display interface of the mobile terminal in which the webpage browsing device is located; step 103 also can also display the requested webpage on a display interface supported by the webpage browsing device, for example, display the requested webpage on an external display interface connected with the webpage browsing device.

The embodiment of the present disclosure can save transmission bandwidth, quicken response to a webpage request, and meanwhile improve webpage browsing effect and browsing experience of a user.

Figure 9:
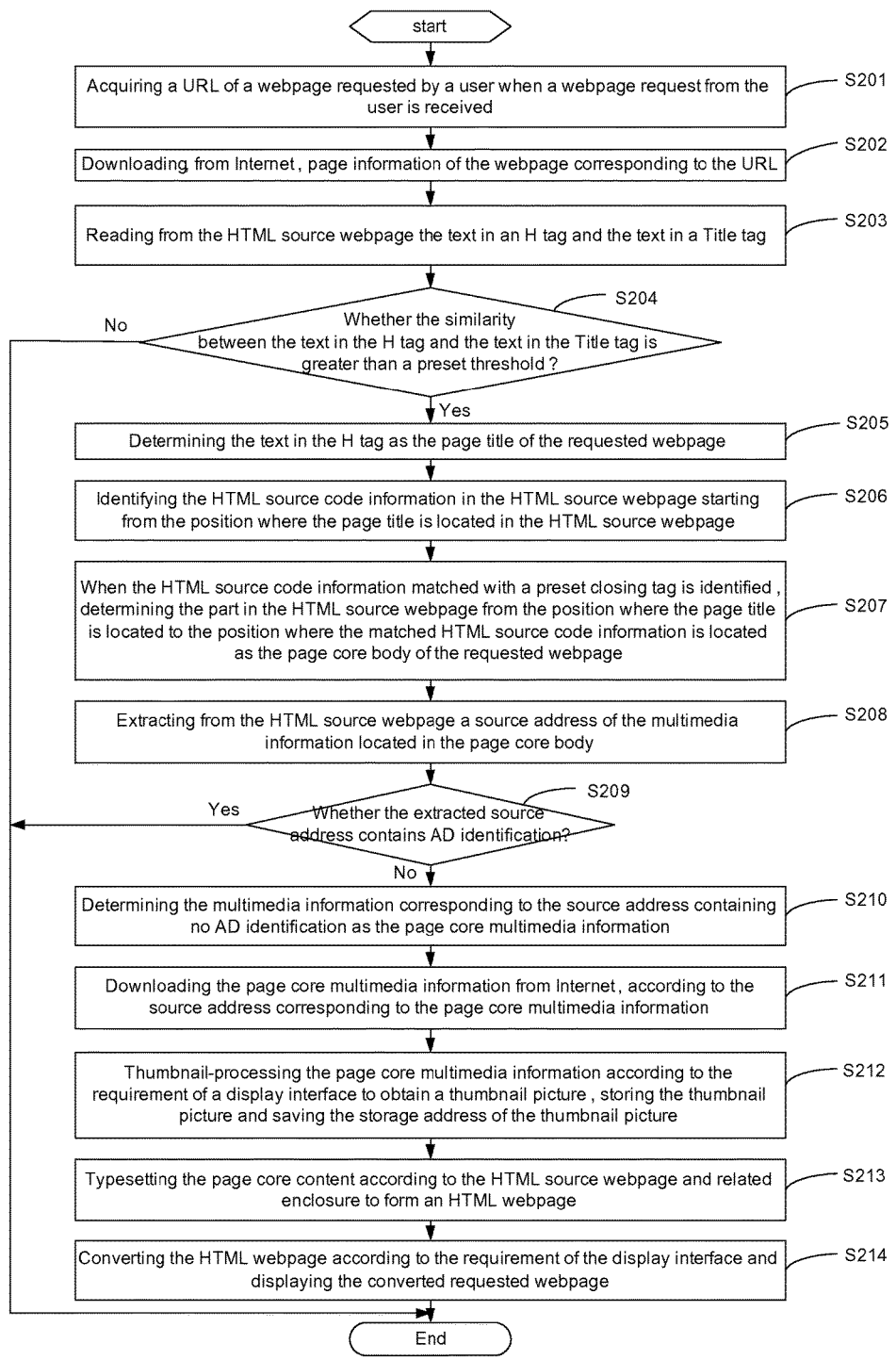
FIG. 9 shows a flowchart of a second embodiment of the webpage browsing method according to the present disclosure.

Refer to FIG. 9, which shows a flowchart of a second embodiment of the webpage browsing method according to the present disclosure. In this embodiment, the executer of the method is the webpage browsing device described above. The webpage browsing device executes the method according to the following process, including:

Step 201: acquiring a URL of a webpage requested by a user when a webpage request from the user is received.

The user can send the webpage request to the webpage browsing device by inputting the URL of the requested webpage directly or clicking the link address of the requested webpage, wherein the webpage request carries the URL of the requested webpage. In Step 201, when the webpage request is received from the user, the URL of the webpage requested by the user is extracted from the webpage request.

Step 202: downloading, from Internet, page information of the webpage corresponding to the URL.

In Step 202, page information of the webpage requested by the user is downloaded from Internet according to the URL acquired in Step 201, wherein the page information includes: HTML source webpage and related enclosure, in which the HTML source webpage includes: HTML source code information, HTML tag and source address of multimedia information; and the related enclosure includes: one or more of CSS, Frame and JS.

In this embodiment, Step 201 to Step 202 is the specific process of Step 101 in the above embodiment.

Step 203: reading from the HTML source webpage the text in an H tag and the text in a Title tag.

The H tag includes: any one of H1 tag, H2 tag, H3 tag, H4 tag, H5 tag and H6 tag; the H tag (H1 tag to H6 tag) refers to a tag for emphasizing the importance of the text title in the HTML webpage; tags <H1>, <H2>, <H3>, <H4>, <H5> and <H6> represent that importance is diminished in turn, wherein tag <H1> represents the most important text title, while <H6> represents the least important text title. Preferably, in Step 203, the text in the H1 tag and the text in the Title tag are read from the HTML source webpage. The Title tag is included in a Head tag of the HTML source webpage and is used to define the title of a page document, with the main purpose of informing the subject of this document to a visitor and providing an index to a search engine; the text in the Title tag and the text in the H tag (H1 tag to H6 tag) may be the same, or different.

Step 204: determining whether the similarity between the text in the H tag and the text in the Title tag is greater than a preset threshold; if so, going to Step 205; otherwise, ending the process.

The preset threshold can be set according to actual requirements, and the value of the threshold can be in a range of 0-100%; for example: the threshold can be set to 90%, in Step 204 it is determined whether the similarity between the text in the H1 tag and the text in the Title tag is above 90%, here an example can be provided for illustration, supposing a 11-character text is read from the H1 tag and a 11-character text is read from the Title tag in Step 203, and it is determined that the text in the H1 tag has 10 characters the same as the text in the Title tag in Step 204, then it is determined that the two texts have a similarity of above 90%. It should be appreciated that the preset threshold can be other values, and other methods can be adopted to perform the determination of similarity in Step 204; the analysis in other conditions is similar to the above and no further description is needed here.

Step 205: determining the text in the H tag as the page title of the requested webpage.

If it is determined that the similarity between the text in the H1 tag and the text in the Title tag exceeds a preset threshold in Step 204, the text in the H tag is determined as the page title of the requested webpage in Step 205.

Step 206: identifying the HTML source code information in the HTML source webpage starting from the position where the page title is located in the HTML source webpage.

In actual application, the position where the page title is located in the HTML source webpage generally is the start of the page core body of the requested webpage. After the page title is determined in Step 205, the HTML source code information is identified in the HTML source webpage starting from the position where the page title is located in the HTML source webpage in Step 206.

Step 207: when the HTML source code information matched with a preset closing tag is identified, determining the part in the HTML source webpage from the position where the page title is located to the position where the matched HTML source code information is located as the page core body of the requested webpage.

Here, the preset closing tag includes but not limited to: any one or more of "Related Comment" identification, "Related Link" identification, "Related Reading" identification and "Related Recommendation" identification. Generally, when key words such as "Related Comment" or "Related Link" appears in the webpage, it is indicated that the content of the page core body of the webpage is ended. Therefore, the position where "Related Comment" or "Related Link" appears can be determined as the end of the page core body of the webpage. In Step 207, when the HTML source code information matched with the preset closing tag is identified from the HTML source webpage, the part in the HTML source webpage from the position where the page title is located (the start of the page core body) to the position where the matched HTML source code information is located (the end of the page core body) is determined as the page core body of the requested webpage.

Step 208: extracting from the HTML source webpage a source address of the multimedia information located in the page core body.

Here, the page core multimedia information is the multimedia information related to the page core body, including but not limited to: any one or more of picture, video and Flash. In the conventional HTML webpage, there is much multimedia information, while most information is noise information irrelevant to the page core body of the webpage, for example, AD picture, AD flash and the like, wherein some noise information is located in the page core body of the HTML webpage, and some is surrounding the page core body. In Step 208, the multimedia information surrounding the page core body is filtered and the source address of the multimedia information located in the page core body is extracted from the HTML source webpage.

Step 209: determining whether the extracted source address contains an AD identification; if not, going to Step 210; otherwise, ending the process.

Since the source address corresponding to the noise information carries an AD identification, including information of AD provider, AD prompt information and the like, and the multimedia information in the page core body probably is noise information as described above, it is further determined in Step 209 based on Step 208 whether the source address corresponding to the multimedia information extracted from the page core body contains an AD identification; if so, the multimedia information corresponding to the source address containing the AD identification should be noise information; otherwise, the multimedia information corresponding to the source address containing no AD identification should be the multimedia information related to the page core body.

Step 210: determining the multimedia information corresponding to the source address containing no AD identification as the page core multimedia information.

In this embodiment, Step 203 to Step 210 is the specific process of Step 102 in the above embodiment.

Step 211: downloading the page core multimedia information from Internet, according to the source address corresponding to the page core multimedia information.

After the page core multimedia information of the requested webpage is determined in Step 210, in Step 211, the source address corresponding to the page core multimedia information can be read from the HTML source webpage and the page core multimedia information can be downloaded from Internet according to the source address, wherein the page core multimedia information is multimedia information related to the page core body, including but not limited to: any one or more of picture, video and Flash.

Step 212: thumbnail-processing the page core multimedia information according to the requirement of a display interface to obtain a thumbnail picture, storing the thumbnail picture and saving the storage address of the thumbnail picture.

Since the display interface supported or provided by the webpage browsing device is limited in size, for example, the size of the display interface of the mobile terminal in which the webpage browsing device is located is far less than the size of the display interface of a conventional PC, the page core multimedia information downloaded in Step 211 is not suitable to be displayed on the display interface of the mobile terminal. Meanwhile, in order to improve the transmission rate of the multimedia information and to quicken the response of webpage, it is required to thumbnail-process the page core multimedia information, wherein in Step 212 this process may include: when the page core multimedia information is a picture, thumbnail-processing the picture according to the length and width of the display interface to form a thumbnail picture, storing the thumbnail picture and saving the storage address of the thumbnail picture; when the page core multimedia information is a video or Flash, first extracting at least one frame of key-frame image of the video or Flash and then thumbnail-processing the key-frame image according to the length and width of the display interface to form a thumbnail picture, storing the thumbnail picture and saving the storage address of the thumbnail picture; wherein the length of the thumbnail picture is not greater than the length of the display interface, and the width of the thumbnail picture is not greater than the width of the display interface.

Step 213: typesetting the page core content according to the HTML source webpage and related enclosure to form an HTML webpage.

In Step 213, the page core content is typeset, wherein the page core content includes: a page title, a page core body and page core multimedia information; the process of Step 213 may include: based on the HTML source webpage and related enclosure, typesetting according to the position where the page core content is located in the original requested webpage and the display manner to form an HTML webpage. For example, the HTML source webpage records the position where the page title is located in the HTML source webpage, meanwhile CSS records the font type and colour of the page title; then in Step 213, the page title is arranged to a corresponding position in the HTML webpage according to the record in the HTML source webpage, and meanwhile the page title is processed in accordance with the corresponding font type and colour recorded in the CSS. In Step 213, through the typesetting process on the page core content, the formed HTML webpage has the same effect in displaying the page core content as the original requested HTML webpage, and the readability of the page is not lost.

Step 214: converting the HTML webpage according to the requirement of the display interface and displaying the converted requested webpage.

In Step 214, the conversion process may include: replacing the source address corresponding to the page core multimedia information in the HTML webpage with the storage address of the corresponding thumbnail picture; and/or replacing or deleting the HTML tag in the HTML webpage not supported by the display interface according to the format requirement of the display interface, to form a WAP webpage, wherein the WAP webpage is WAP1.0 webpage or WAP2.0 webpage. In specific implementation, Step 214 performs conversion according to the requirement of the display interface supported or provided by the webpage browsing device, for example, when the mobile terminal in which the webpage browsing device is located can support HTML webpages, but can not well support the multimedia information of the original HTML webpage, then the conversion process may include: replacing the source address corresponding to the page core multimedia information in the typeset HTML webpage with the storage address of the corresponding thumbnail picture, to finally form a HTML webpage to provide to the mobile terminal to display. For another example, when the mobile terminal in which the webpage browsing device is located can not well support HTML webpages, but the function of the display interface is powerful and can support multimedia information, then the conversion process may include: replacing or deleting the HTML tag contained in the HTML webpage not supported by the display interface according to the format requirement of the display interface, to finally form a WAP1.0 webpage or WAP2.0 webpage to provide to the mobile terminal to display. As a further example, when the mobile terminal in which the webpage browsing device is located can not well support HTML webpages, but supports WAP1.0 webpage or WAP2.0 webpage only, then the conversion process mat include: first replacing the source address corresponding to the page core multimedia information in the HTML webpage with the storage address of the corresponding thumbnail picture, and then replacing or deleting the HTML tag contained in the HTML webpage not supported by the display interface according to the format requirement of the display interface, to finally form a WAP1.0 webpage or WAP2.0 webpage to provide to the mobile terminal to display.

For a better understanding of the present disclosure, a specific example is provided below for illustration.

Figure 10:
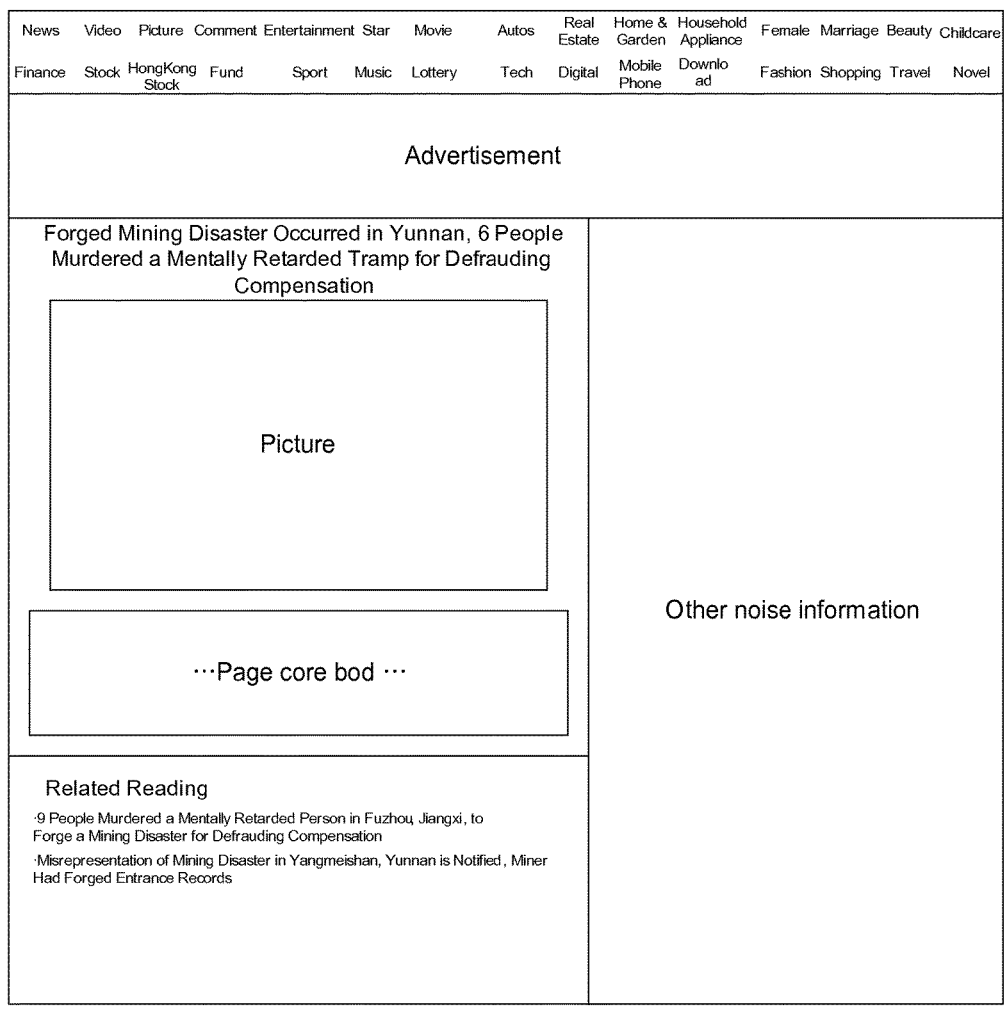
FIG. 10 shows a first diagram of an application of the webpage browsing method according to the present disclosure.

Refer to FIG. 10, which shows a first diagram of an application of the webpage browsing method according to the present disclosure. When a user inputs http://news.qq.com/a/20110719/000584.htm in an address bar, or clicks a link of this webpage in QQ news homepage, Step 201 can receive a webpage request from the user and acquires the URL (that is, http://news.qq.com/a/20110719/000584.htm) of the requested webpage; Step 202 downloads page information corresponding to the HTML webpage shown in FIG. 10 from Internet according to this URL, including: HTML source webpage and related enclosure. Step 203 reads the text in <H1> tag that "Forged Mining Disaster Occurred in Yunnan, 6 People Murdered a Mentally Retarded Tramp for Defrauding Compensation", and reads the text in <Title> that "Yunnan Web, Forged Mining Disaster in Yunnan, 6 People Murdered a Mentally Retarded Tramp for Defrauding Compensation". Step 204 determines that the two texts read in Step 203 have a high similarity, over the preset threshold, for example, 90%. Step 205 determines the text in <H1> tag that "Forged Mining Disaster Occurred in Yunnan, 6 People Murdered a Mentally Retarded Tramp for Defrauding Compensation" as the page title of the webpage, and also the start of the page core body. Step 206 identifies the HTML source code information in the HTML source webpage starting from the position where the page title is located, when the "Related Reading" identification shown in FIG. 10 is identified, Step 207 determines that this position is the end of the page core body, then the part in the HTML source webpage from the position where the page title is located to the position where "Related Reading" identification is located is the page core body of the requested webpage.

Step 208 to Step 212 download and thumbnail-process the picture in the page core content related to this page core body to form a thumbnail picture, store the thumbnail picture and save the storage address. Step 213 typesets the page title, the page core body, and the page core multimedia information (that is, picture) in the page core body according to the layout and proportion of the original webpage, and finally replaces the picture's source address with the storage address of the thumbnail picture according to the requirement of the display interface of the mobile terminal, and replaces or deletes the HTML tag to form the WAP1.0 webpage shown in FIG. 11 to display in the mobile terminal. Refer to FIG. 11, which shows a second diagram of the application of the webpage browsing method according to the present disclosure, FIG. 11 is the diagram of a WAP1.0 webpage finally displayed by a mobile terminal, the WAP1.0 webpage includes the page core content only, and other surrounding noise information is dropped, folded or hidden, so that the user can read the core information of the requested webpage directly, and thereby the browsing effect of the mobile terminal is improved.

The embodiment of the present disclosure analyzes the webpage requested by the user to obtain the page core content of the requested webpage, typesets the page core content and then displays the typeset content. Since only the page core content of the conventional HTML webpage is extracted, transmission bandwidth is saved and response to the webpage is quickened; since only the page core content is typeset, the mobile terminal can normally present the typeset webpage, meanwhile the user can find useful information (that is, page core content) directly from the webpage displayed by the mobile terminal, thus the webpage browsing effect and the browsing experience of the user are improved.

Those of ordinarily skilled in the art should be appreciated that all or part of the flows in the above exemplary embodiment can be accomplished by instructing relevant hardware through a computer program. The program can be stored in a computer-readable storage medium. When the program is executed, the flows of the embodiment of each method can be included. The storage medium can be a disk, a compact disk, a Read-Only Memory (ROM), a Random Access Memory (RAM) or the like.

The above is only the preferred embodiment of the present disclosure and not intended to limit the scope of the present disclosure. Any equivalent variations according to the claims of the present disclosure should be within the scope of the present disclosure.

The invention claimed is:

1. A method for webpage browsing, comprising:
   downloading a page information of a requested webpage when a webpage request from a user is received;
   analyzing the page information to obtain a page core content and a noise information of the requested webpage; and
   typesetting the page core content and displaying the requested webpage that has been typeset, and folding the noise information of the requested webpage;
   wherein the page core content comprises source address corresponding to page core multimedia information, and the method further comprises:
   downloading the page core multimedia information from Internet according to the source address corresponding to the page core multimedia information;
   thumbnail-processing the page core multimedia information according to the requirement of the display interface to obtain the thumbnail picture;
   wherein when the page core multimedia information is a video or Flash, the step of thumbnail-processing the page core multimedia information according to the requirement of the display interface to obtain the thumbnail picture includes:
   extracting at least one key-frame image of the video or Flash;
   thumbnail-processing the key-frame image according to the length and width of the display interface to form a thumbnail picture; and
   storing the thumbnail picture and saving the storage address of the thumbnail picture;
   wherein when the page core multimedia information is a video or Flash, the step of typesetting the page core content and displaying the requested webpage that has been typeset includes:
   typesetting according to the position where the page core content is located in an original requested webpage and the display manner to form an HTML webpage;
   replacing the source address corresponding to the page core multimedia information in the HTML webpage with the storage address of the corresponding thumbnail picture;
   wherein the step of analyzing the page information to obtain the page core content and the noise information of the requested webpage includes:
   reading from the HTML source webpage a text in a text title H tag and a text in a Title tag;
   determining whether a similarity between the text in the H tag and the text in the Title tag is greater than a preset threshold;
   determining the text in the H tag as a page title of the requested webpage when it is determined that the similarity between the text in the H tag and the text in the Title tag is greater than the preset threshold, wherein the preset threshold is under 100% and when the similarity between the text in the H tag and the text in the Title tag is above the preset threshold, the text in the H tag is determined as the page title of the requested webpage;
   identifying the HTML source code information in the HTML source webpage starting from the position where the page title is located in the HTML source webpage;
   when the HTML source code information matched with a preset closing tag is identified, determining the part in the HTML source webpage from the position where the page title is located to the position where the matched HTML source code information is located as the page core body of the requested webpage;
   wherein the H tag includes: any one of H1 tag, H2 tag, H3 tag, H4 tag, H5 tag and H6 tag; and
   the preset closing tag includes: any one or more of Related Comment identification, Related Link identification, Related Reading identification and Related Recommendation identification.

2. The method according to claim 1, wherein step of downloading page information of the requested webpage when the webpage request from the user is received includes:
   acquiring a Uniform Resource Locator (URL) of the webpage requested by the user when the webpage request from the user is received;
   downloading, from Internet, page information of the webpage corresponding to the URL,
   wherein the page information includes: Hypertext Markup Language (HTML) source webpage and related enclosure;
   the HTML source webpage includes: HTML source code information and HTML tag; and
   the related enclosure includes: one or more of Cascading Style Sheets (CSS), ActiveX Frame and webpage JavaScript (JS).

3. The method according to claim 2, wherein the page core content includes: a page title and a page core body.

4. The method according to claim 3, wherein the HTML source webpage further includes: source address of multimedia information;
   the page core content further includes: page core multimedia information;
   after the page core body of the requested webpage is determined, the method further comprises:
   extracting from the HTML source webpage the source address of the multimedia information located in the page core body;
   determining whether the extracted source address contains an Advertisement (AD) identification, and determining the multimedia information corresponding to the source address containing no AD identification as the page core multimedia information;

wherein the page core multimedia information is the multimedia information related to the page core body, including: any one or more of picture, video and Flash.

5. The method according to claim 4, wherein after the page core multimedia information is determined, the method further comprises:
thumbnail-processing the page core multimedia information according to the requirement of a display interface to obtain a thumbnail picture, storing the thumbnail picture and saving the storage address of the thumbnail picture.

6. The method according to claim 5, wherein when the page core multimedia information is a picture, the step of thumbnail-processing the page core multimedia information according to the requirement of the display interface to obtain the thumbnail picture includes:
thumbnail-processing the picture according to the length and width of the display interface to form the thumbnail picture; and
thumbnail-processing the key-frame image according to the length and width of the display interface to form the thumbnail picture;
wherein the length of the thumbnail picture is not greater than the length of the display interface, and the width of the thumbnail picture is not greater than the width of the display interface.

7. The method according to claim 2, wherein the step of typesetting the page core content and displaying the requested webpage that has been typeset includes:
typesetting the page core content according to the HTML source webpage and related enclosure to form an HTML webpage; and
converting the HTML webpage according to the requirement of the display interface and displaying the converted requested webpage.

8. The method according to claim 7, wherein the step of converting the HTML webpage according to the requirement of the display interface and displaying the converted requested webpage includes:
replacing or deleting the HTML tag in the HTML webpage not supported by the display interface according to the format requirement of the display interface, to form a Wireless Application Protocol (WAP) webpage;
wherein the WAP webpage is WAP1.0 webpage or WAP2.0 webpage.

9. The method according to claim 1, wherein the noise information includes an advertisement (AD) picture or an AD Flash.

10. The method according to claim 9, wherein the step of analyzing the page information to obtain the page core content and the noise information of the requested webpage further comprises:
determining whether the source address corresponding to the page core multimedia information contains an AD identification;
when the source address corresponding to the page core multimedia information contains the AD identification, the source address corresponding to the page core multimedia information is determined as the noise information; and
when the source address corresponding to the page core multimedia information does not contain the AD identification, the source address corresponding to the page core multimedia information is determined as the page core content.

11. The method according to claim 1, wherein the preset threshold is 90% and when the similarity between the text in the H tag and the text in the Title tag is above 90%, the text in the H tag is determined as the page title of the requested webpage.

12. A device for webpage browsing, comprising:
one or more processors; and
a memory coupled to the one or more processors, the one or more processors are configured to:
download page information of a requested webpage when a webpage request from a user is received;
analyze the page information to obtain a page core content and a noise information of the requested webpage, wherein the page core content comprises source address corresponding to page core multimedia information;
download the page core multimedia information from Internet according to the source address corresponding to the page core multimedia information;
thumbnail-process the page core multimedia information according to the requirement of a display interface to obtain a thumbnail picture, wherein when the page core multimedia information is a video or Flash, the procedure of thumbnail-processing the page core multimedia information according to the requirement of the display interface to obtain the thumbnail picture includes: extracting at least one key-frame image of the video or Flash; thumbnail-processing the key-frame image according to the length and width of the display interface to form a thumbnail picture; and storing the thumbnail picture and saving the storage address of the thumbnail picture;
typeset the page core content and fold the noise information of the requested webpage, wherein when the page core multimedia information is a video or Flash, typeset according to the position where the page core content is located in an original requested webpage and the display manner to form an HTML webpage, and replace the source address corresponding to the page core multimedia information in the HTML webpage with the storage address of the corresponding thumbnail picture; and
display the requested webpage;
wherein the one or more processors are further configured to:
read from the HTML source webpage a text in a text title H tag and a text in a Title tag;
determine whether a similarity between the text in the H tag and the text in the Title tag is greater than a preset threshold;
determine the text in the H tag as a page title of the requested webpage when the determination result is Yes, wherein the preset threshold is under 100% and when the similarity between the text in the H tag and the text in the Title tag is above the preset threshold, the text in the H tag is determined as the page title of the requested webpage;
identify the HTML source code information in the HTML source webpage starting from the position where the page title is located in the HTML source webpage;
when the HTML source code information matches with a preset closing tag, determine the part in the HTML source webpage from the position where the page title is located to the position where the matched HTML source code information is located as the page core body of the requested webpage;
wherein the H tag includes: any one of H1 tag, H2 tag, H3 tag, H4 tag, H5 tag and H6 tag; and the preset closing tag includes: any one or more of Related Commentidentification, Related Link identification, Related Reading identification and Related Recommendation identification.

13. The device according to claim 12, wherein the one or more processors are further configured to:
    acquire a Uniform Resource Locator (URL) of the webpage requested by the user when the webpage request from the user is received;
    download, from Internet, page information of the webpage corresponding to the URL,
    wherein the page information includes: Hypertext Markup Language (HTML) source webpage and related enclosure;
    the HTML source webpage includes: HTML source code information and HTML tag; and
    the related enclosure includes: one or more of Cascading Style Sheets (CSS), ActiveX Frame and webpage JavaScript (JS).

14. The device according to claim 13, wherein the page core content includes: a page title and a page core body.

15. The device according to claim 14, wherein the HTML source webpage further includes: source address of multimedia information; the page core content further includes: page core multimedia information; and the one or more processors are further configured to:
    extract from the HTML source webpage the source address of the multimedia information located in the page core body;
    determine whether the source address contains an AD identification;
    determine the multimedia information corresponding to the source address containing no AD identification as the page core multimedia information according to the determination result;
    wherein the page core multimedia information is the multimedia information related to the page core body, including: any one or more of picture, video and Flash.

16. The device according to claim 15, the one or more processors are further configured to:
    thumbnail-process the page core multimedia information according to the requirement of a display interface to obtain a thumbnail picture, store the thumbnail picture and save the storage address of the thumbnail picture.

17. The device according to claim 16, wherein the one or more processors are further configured to:
    when the page core multimedia information is a picture, thumbnail-process the picture according to the length and width of the display interface to form a thumbnail picture;
    wherein the length of the thumbnail picture is not greater than the length of the display interface, and the width of the thumbnail picture is not greater than the width of the display interface.

18. The device according to claim 13, wherein one or more processors are further configured to:
    typeset the page core content according to the HTML source webpage and related enclosure to form an HTML webpage; and
    convert the HTML webpage according to the requirement of the display interface to form a converted requested webpage.

19. The device according to claim 18, wherein the one or more processors are further configured to:
    replace or delete the HTML tag in the HTML webpage not supported by the display interface according to the format requirement of the display interface to form a WAP webpage;
    wherein the WAP webpage is WAP1.0 webpage or WAP2.0 webpage.

20. A mobile terminal, comprising a webpage browsing device, wherein the webpage browsing device comprises:
    one or more processors; and
    a memory coupled to the one or more processors, the one or more processors are configured to:
    download page information of a requested webpage when a webpage request from a user is received;
    analyze the page information to obtain a page core content and a noise information of the requested webpage, wherein the page core content comprises source address corresponding to page core multimedia information;
    download the page core multimedia information from Internet according to the source address corresponding to the page core multimedia information;
    thumbnail-process the page core multimedia information according to the requirement of a display interface to obtain a thumbnail picture, wherein when the page core multimedia information is a video or Flash, the procedure of thumbnail-processing the page core multimedia information according to the requirement of the display interface to obtain the thumbnail picture includes: extracting at least one key-frame image of the video or Flash; thumbnail-processing the key-frame image according to the length and width of the display interface to form a thumbnail picture; and storing the thumbnail picture and saving the storage address of the thumbnail picture;
    typeset the page core content and fold the noise information of the requested webpage, wherein when the page core multimedia information is a video or Flash, typeset according to the position where the page core content is located in an original requested webpage and the display manner to form an HTML webpage, and replace the source address corresponding to the page core multimedia information in the HTML webpage with the storage address of the corresponding thumbnail picture; and
    display the requested webpage;
    wherein the one or more processors are further configured to:
    read from the HTML source webpage a text in a text title H tag and a text in a Title tag;
    determine whether a similarity between the text in the H tag and the text in the Title tag is greater than a preset threshold;
    determine the text in the H tag as a page title of the requested webpage when the determination result is Yes, wherein the preset threshold is under 100% and when the similarity between the text in the H tag and the text in the Title tag is above the preset threshold, the text in the H tag is determined as the page title of the requested webpage;
    identify the HTML source code information in the HTML source webpage starting from the position where the page title is located in the HTML source webpage;
    when the HTML source code information matches with a preset closing tag, determine the part in the HTML source webpage from the position where the page title is located to the position where the matched HTML source code information is located as the page core body of the requested webpage;

wherein the H tag includes: any one of H1 tag, H2 tag, H3 tag, H4 tag, H5 tag and H6 tag; and the preset closing tag includes: any one or more of Related Comment identification, Related Link identification, Related Reading identification and Related Recommendation identification.

\* \* \* \* \*